(12) United States Patent
Lee

(10) Patent No.: US 10,256,764 B2
(45) Date of Patent: Apr. 9, 2019

(54) METHOD AND DEVICE FOR DETERMINING A ROTOR TEMPERATURE, COMPUTER PROGRAM, AND COMPUTER PROGRAM PRODUCT

(71) Applicant: Robert Bosch GmbH, Stuttgart (DE)

(72) Inventor: Wei-Lung Lee, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/324,498

(22) PCT Filed: May 7, 2015

(86) PCT No.: PCT/EP2015/060015
§ 371 (c)(1),
(2) Date: Jan. 6, 2017

(87) PCT Pub. No.: WO2016/005074
PCT Pub. Date: Jan. 14, 2016

(65) Prior Publication Data
US 2017/0155353 A1    Jun. 1, 2017

(30) Foreign Application Priority Data
Jul. 7, 2014   (DE) .................. 10 2014 213 103

(51) Int. Cl.
*H02P 6/16*        (2016.01)
*H02P 29/66*       (2016.01)
(Continued)

(52) U.S. Cl.
CPC ............ *H02P 29/664* (2016.11); *H02P 29/66* (2016.02)

(58) Field of Classification Search
CPC ............ G05B 15/02; H02P 21/22; H02P 6/08
See application file for complete search history.

(56) References Cited

U.S. PATENT DOCUMENTS

| | | | |
|---|---|---|---|
| 6,042,265 A * | 3/2000 | Kliman | ............ G01K 7/42 318/471 |
| 2005/0067991 A1 * | 3/2005 | El-Ibiary | ............ H02P 23/14 318/490 |

(Continued)

FOREIGN PATENT DOCUMENTS

| | | |
|---|---|---|
| CN | 102549910 A | 7/2012 |
| CN | 102853944 A | 1/2013 |

(Continued)

OTHER PUBLICATIONS

International Search Report for Application No. PCT/EP2015/060015 dated Jul. 17, 2015 (English Translation, 3 pages).

(Continued)

*Primary Examiner* — Bickey Dhakal
*Assistant Examiner* — Charles S Laughlin
(74) *Attorney, Agent, or Firm* — Michael Best & Friedrich LLP

(57) ABSTRACT

The invention relates to a method for determining a rotor temperature of an electric motor, in particular an asynchronous motor, the rotor temperature being determined at least in accordance with reactive powers and/or in accordance with losses of the electric motor. A first rotor temperature is determined in accordance with the reactive powers and, depending on an operating range of the electric motor, plausibility-checked or replaced by a second rotor temperature, which is determined in accordance with the losses.

8 Claims, 3 Drawing Sheets

(51) Int. Cl.
H02P 6/14 (2016.01)
H02P 23/24 (2016.01)

(56) References Cited

U.S. PATENT DOCUMENTS

2011/0119014 A1* 5/2011 Pushkolli ............... B60K 6/48
                                                    702/99
2012/0133313 A1* 5/2012 Xie ..................... B60W 20/00
                                                    318/473

FOREIGN PATENT DOCUMENTS

DE   102008040725   1/2010
DE   102009025390   1/2010

OTHER PUBLICATIONS

Nandhini Gayathri, M. et al., "Comparison of Rotor Flux and Reactive Power based MRAS Rotor Resistance Estimators for Vector Controlled Induction Motor Drive," Advances in Engineering, Science and Management (ICAESM), 2012 International Conference On, Mar. 31, 2012, pp. 183-189.

* cited by examiner

METHOD AND DEVICE FOR DETERMINING A ROTOR TEMPERATURE, COMPUTER PROGRAM, AND COMPUTER PROGRAM PRODUCT

BACKGROUND OF THE INVENTION

The invention relates to a method for determining a rotor temperature of an electric machine, in particular an asynchronous machine, wherein the rotor temperature is determined at least as a function of reactive powers and/or as a function of losses of the electric machine.

The invention further relates to a corresponding device and to a computer program and a computer program product.

The rotor temperature of an asynchronous machine provides an important piece of information both with regard to the torque accuracy in the case of a field-oriented control and with regard to the thermal protection of the electric machine. For reasons of cost, a telemetry system is not used, as a rule, in mass production for measuring the rotor temperature. Therefore, the rotor temperature is usually determined by means of model calculations. It is known that the rotor temperature is ascertained by means of an electromagnetic model, which determines the rotor temperature as a function of reactive powers of the electric machine, or as a function of a thermal model which determines the rotor temperature as a function of losses. The electromagnetic model is based on the reconciliation between a reactive power calculated on the basis of phase voltage and current and a reactive power calculated on the basis of a flux model which is dependent on motor parameters, stator frequency, and current. A combination of these methods, which is intended to expand their functional range, is also already known.

The thermal model requires losses as input values, wherein the accuracy of the loss calculation has a substantial influence on the estimated or determined rotor temperature. An exact analytical calculation or the experimental ascertainment of losses in the electric machine, in particular in the asynchronous machine, is very time-consuming, however.

SUMMARY OF THE INVENTION

The method, according to the invention, has the advantage that the disadvantages of the known methods are overcome and a possibility is provided for determining rotor temperature, which ensures a reliable and sufficiently accurate determination of the rotor temperature in every operating state or operating range of the electric machine. According to the invention, a first rotor temperature is determined as a function of the reactive powers and, depending on an operating range of the electric machine, is plausibility-checked or replaced by a second rotor temperature which is determined as a function of the losses. The two aforementioned methods for determining rotor temperature are therefore combined with one another in a particular way, wherein, depending on the operating range, either the first or the second rotor temperature is determined as the rotor temperature to be ascertained. As a result, by means of a skillful specification of the operating ranges, it can be ensured that the methods function in the operating ranges that are optimal for each of them and, therefore, yield correspondingly good results. If one temperature is not replaced by the other temperature, it is preferably at least plausibility-checked by the other temperature.

According to one advantageous refinement of the invention, the first rotor temperature in a part-load operating range is replaced by the second rotor temperature. The temperature can no longer be estimated in an optimal manner on the basis of the reactive powers, in particular, when the phase voltage is very low or is in the range of low rotational speeds, for example in the part-load range. In this operating range, the rotor temperature can be better ascertained as a function of losses. Given that the first rotor temperature in this operating range is then replaced by the second rotor temperature, it is ensured that only a rotor temperature that is meaningful will also continue to be output as the variable to be observed.

It is also preferably provided that system-dependent errors are ascertained and stored in a characteristic map as a function of reactive powers for the determination of the first rotor temperature. In particular, system-dependent errors in the electric machine equipped with telemetry are ascertained and stored as a characteristic map. The characteristic map can also be based on electric machines which correspond to the electric machine provided with telemetry. The first rotor temperature can be inferred, as a function of reactive powers that are then detected or ascertained, by using the characteristic map.

Advantageously, it is also provided that the second rotor temperature is plausibility-checked by the first rotor temperature when the electric machine is operated in an operating range in which the first rotor temperature can be sufficiently accurately ascertained by means of the above-described method. As a result, errors in the system can be detected, for example, and the robustness of the temperature detection can be increased.

According to one advantageous refinement of the invention, the first rotor temperature is replaced by the second rotor temperature when the electric machine is stopped, wherein the electric machine is excited by an alternating current in order to determine an electric resistance of the electric machine, and the second rotor temperature is determined as a function of the electric resistance, as a definitive loss for the rotor temperature. Therefore, a further method for determining the rotor temperature is introduced, in which the second rotor temperature is considered to be the definitive temperature, and wherein the electric machine is operated as a type of transformer, in order to generate losses. It is pointless to carry out the methods for determining the rotor temperature as a function of the reactive power or losses at rest. Due to the operation in the manner of a transformer, i.e., by means of electrical excitation, losses occur without a torque being generated. Therefore, the rotor temperature can also be reliably and sufficiently accurately determined at rest.

Preferably, it is further provided that system-dependent errors are measured or are detected via measurements before the start-up of the electric machine. As previously mentioned, the detected values are then stored in a characteristic map, in particular, which can be accessed during operation of the electric machine.

Furthermore, it is preferably provided that a temperature change is ascertained as a function of the losses and is used as the limit value for the determination of the first rotor temperature. In this case, it is also provided that, due to the loss-based method for determining the rotor temperature, a limit is set for carrying out the method for determining the rotor temperature as a function of the reactive powers. The two different procedures therefore mutually influence one another and result in an intelligent system which ensures the reliable detection of the relevant rotor temperature.

The device according to the invention is distinguished by a specially configured control device which is designed for carrying out the method according to the invention.

The computer program, according to the invention, provides that all steps of the method according to the invention are carried out when said method runs on a computer.

The computer program product, according to the invention, which comprises a program code stored on a machine-readable carrier, carries out the method according to the invention when the program runs on a computer.

BRIEF DESCRIPTION OF THE DRAWINGS

The invention is explained in greater detail in the following with reference to an exemplary embodiment. Wherein.

DETAILED DESCRIPTION

Figure 1:
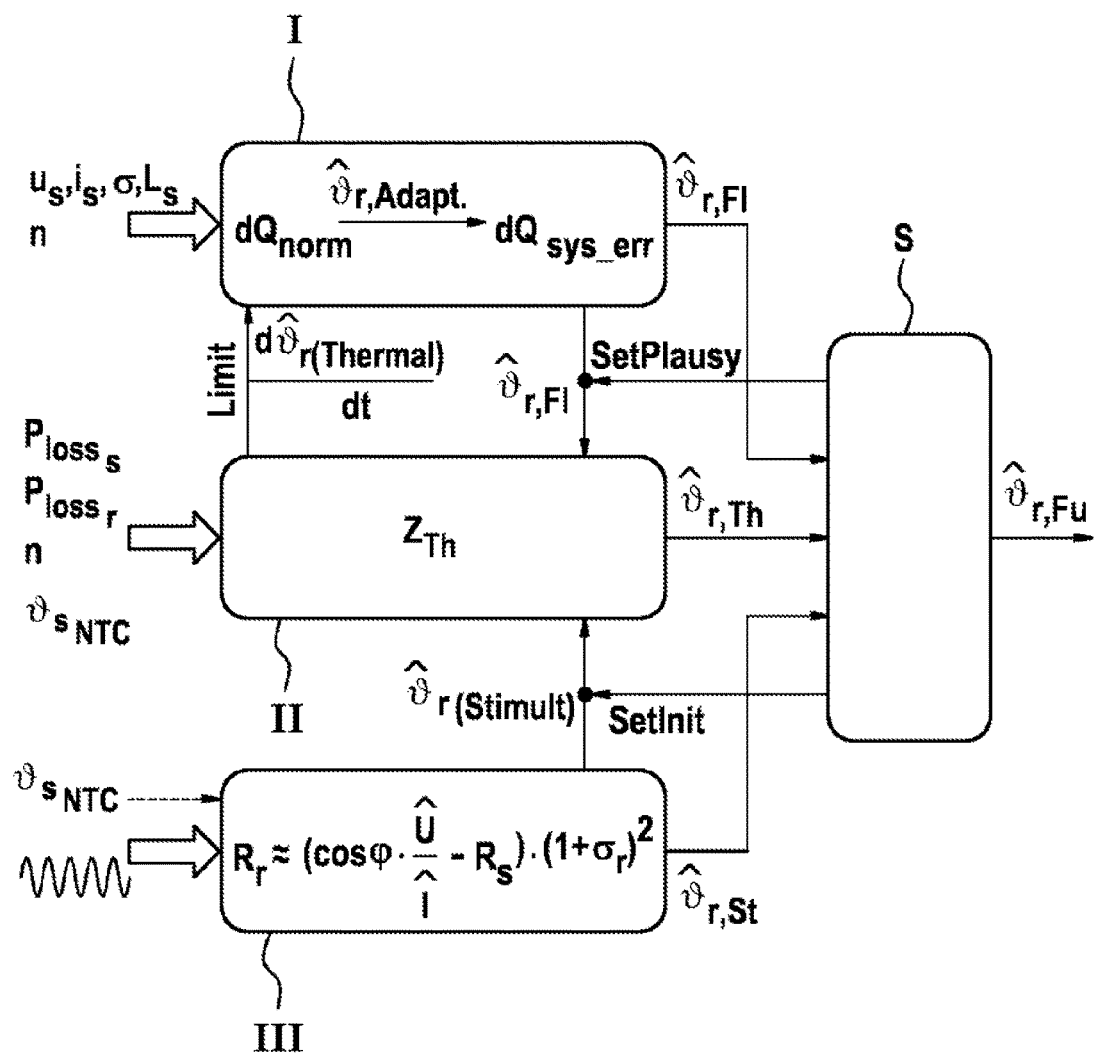
FIG. 1 shows a method for determining the rotor temperature of an electric machine in different operating ranges.

FIG. 1 shows an advantageous method for operating an electric asynchronous machine, by means of which a rotor temperature of the asynchronous machine is intended to be determined. The method includes three method parts, i.e., I, II and III, of which at least the method parts I and II are carried out simultaneously. The three method parts I, II and III are controlled and evaluated by a control unit S, in order to determine a rotor temperature $\hat{\vartheta}_{r,F_u}$.

The first method part I is an electromagnetic model for determining a first rotor temperature $\hat{\vartheta}_{r,Fl}$. This method is based on a reconciliation between the reactive power calculated on the basis of phase voltage and current and a reactive power calculated on the basis of a flux model, having motor parameters, stator frequency, and current as the input variables. Since the phase voltage frequently is not directly measurable, the voltage setpoint value is preferably used by a current controller of the electric machine as the actual voltage value. The difference between the setpoint voltage value and the actual voltage value is considered to be the voltage error. In addition to the voltage error, system-dependent errors such as motor parameter errors or current sensor errors must be taken into account. The overall error that results is dependent, in turn, on operating points or operating ranges of the asynchronous machine and results in corresponding erroneous values in the determination of the rotor temperature. The determination of the rotor temperature can be inaccurate only as a result of method I, in particular when the phase voltage, for example in the part-load range of the electric machine or in the range in which the rotational speed is very low.

The method part II relates to a thermal model for determining a second rotor temperature $\hat{\vartheta}_{r,Th}$. The thermal model requires losses or loss values as input variables. The accuracy of the loss calculation has substantial influence on the rotor temperature ascertained therefrom. An accurate analytical calculation or experimental ascertainment of losses of the asynchronous machine is very time-consuming. During operation, an error in the ascertainment of the rotor temperature is cumulative and continuously increases.

The method in FIG. 1 proposes a skillful combination of the two method parts I and II, whereby the rotor temperature $\hat{\vartheta}_{r,F_u}$ can be determined very accurately.

System-dependent errors in the method part I are initially ascertained using a prototype machine of the electric machine, which is equipped with telemetry, and are stored as a characteristic map. For further production machines of the electric machine having an identical electromagnetic design or telemetry, the first rotor temperature $\hat{\vartheta}_{r,Fl}$ can be ascertained by means of an adaptation (Adapt.) and by the reconciliation of the reactive powers.

The thermal model (method part II) runs parallel to the method part I and simultaneously yields an estimated temperature change as the limitation for the adaption (Adapt.) in method part I (Limit). In the operating range in which the estimated value according to method part I is reliable, the ascertained first rotor temperature is plausibility-checked (SetPlausy) by the rotor temperature ascertained in the second method part II, and so a cumulative error remains minimized.

The third method part III is provided for an operating state of the electric machine, in which the rotor of the electric machine is stopped and a load is not applied. In this operating state, the method parts I and II are not functional, since the required input variables are missing. In method part III, it is therefore provided that the electric machine is acted upon, in the manner of a transformer, with an excited current, which generates losses in the electric machine. The rotor temperature $\hat{\vartheta}_{r(Stimult)}$ estimated as a result is then used by method step II (SetInit) as the starting value for the thermal model.

The control unit S decides which rotor temperature from which estimating method is sufficiently accurate or suitable at the particular current operating point or operating range and also carries out the aforementioned plausibility check of the rotor temperatures. As a result of the fusion of information from the different method parts I, II and III in the control unit S and due to their coordination and plausibility checking, a reliable estimation of the rotor temperature of the asynchronous machine can be obtained, in particular for electric vehicles. The first method part I or the flux model based on reactive powers can be explained as follows. For the case in which $u_s > u_{s,min}$, the following voltage equations and calculations of the reactive power are specified:

$$u_{sd} = R_s i_{sd} + \frac{d}{dt}(\sigma L_s i_{sd}) - \omega_s * \sigma L_s i_{sq} + \frac{L_m}{L_r} * \frac{d}{dt}(\psi_{rd}) \quad \text{(Equation 1)}$$

$$u_{sq} = R_s i_{sq} + \frac{d}{dt}(\sigma L_s i_{sq}) + \omega_s * \sigma L_s i_{sd} + \omega_s * \frac{L_m}{L_r} \psi_{rd} \quad \text{(Equation 2)}$$

$$u_{sq} i_{sd} - u_{sd} i_{sq} \approx \sigma L_s \left[ i_{sd} * \frac{di_{sq}}{dt} - i_{sq} * \frac{di_{sd}}{dt} \right] + \quad \text{(Equation 3)}$$
$$\omega_s \left[ \sigma L_s (i_{sd}^2 + i_{sq}^2) + \frac{L_m}{L_r} \psi_{rd} i_{sd} \right] +$$
$$\frac{L_m}{L_r} \frac{d}{dt}(\psi_{rd}) i_{sq}$$
$$\approx \omega_s \left[ \sigma L_s (i_{sd}^2 + i_{sq}^2) + \frac{L_m}{L_r} \psi_{rd} i_{sd} \right] +$$
$$\frac{L_m}{L_r} \frac{d}{dt}(\psi_{rd}) i_{sq}$$

$$u_{sq} i_{sd} - u_{sd} i_{sq} - \quad \text{(Equation 4)}$$
$$\omega_s \left[ \sigma L_s (i_{sd}^2 + i_{sq}^2) + \frac{L_m}{L_r} \psi_{rd} i_{sd} \right] + \frac{L_m}{L_r} \frac{d}{dt}(\psi_{rd}) i_{sq} \xrightarrow[R,correct]{} 0$$

$$\text{define: } dQ_{norm} = \frac{u_{sq} i_{sd} - u_{sd} i_{sq} - \frac{L_m}{L_r} \frac{d}{dt}(\psi_{rd}) i_{sq}}{\omega_s} -$$
$$\left[ \sigma L_s (i_{sd}^2 + i_{sq}^2) + \frac{L_m}{L_r} \psi_{rd} i_{sd} \right] \xrightarrow[R,correct]{} 0$$

-continued $$dQ_{norm}(\text{steady}) = \qquad \text{(Equation 5)}$$
$$\frac{u_{sq}i_{sd} - u_{sd}i_{sq}}{\omega_s} - [\sigma L_s(i_{sd}^2 + i_{sq}^2) + (1-\sigma)L_s i_{sd}^2] =$$
$$\frac{u_{sq}i_{sd} - u_{sd}i_{sq}}{\omega_s} - [(i_{sd}^2 + \sigma * i_{sq}^2)] * L_s \xrightarrow[R,correct]{} 0$$

The left side of Equation 3 relates to the voltage and the current level. The right side of Equation 3 relates to the current, flux, and motor parameters. It is assumed that the rotor resistance is the only parameter that is dependent on the rotor temperature. If the information regarding the rotor temperature is false, for example due to false flux coordinates, the dq components in Equation 4 and in reality no longer match. Equation 4 is then not equal to zero. In this case, the estimated rotor resistance or the first rotor temperature must be adapted until Equation 4 is correct again. For this purpose, in particular the previously determined, system-dependent errors, in particular in the voltage, the current, and the motor parameters, are taken into account and are stored as characteristic map $dQ_{sy\_serr} \neq 0$. For further production machines having the same electromagnetic design without telemetry, the first rotor temperature $\hat{\vartheta}_{r,FI}$ is ascertained by means of the adaption (Adapt.) of $$dQ_{norm} \xrightarrow[R,correct]{} dQ_{sys\_err} \neq 0.$$

Figure 2:
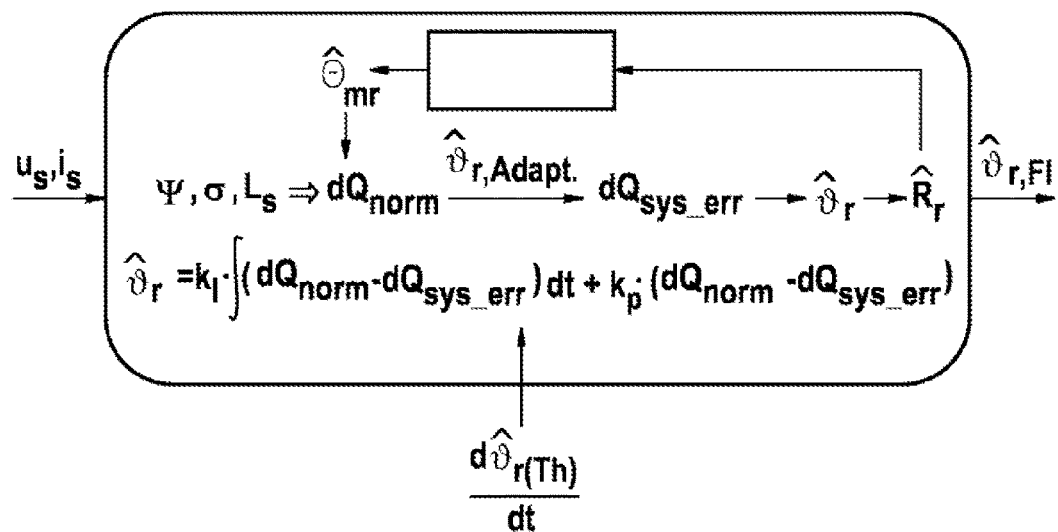
FIG. 2 shows the ascertainment of a first rotor temperature as a function of reactive powers.
Figure 3:
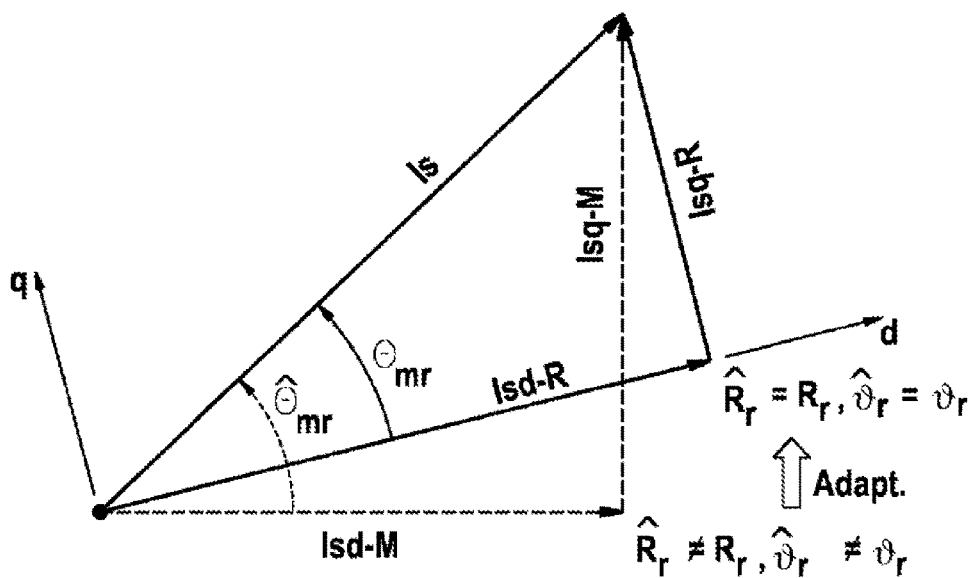
FIG. 3 shows an adaptation of the ascertainment of the first rotor temperature.

The plausible temperature change is delivered by a thermal model of the second method part II and is used as the limit value for the adaption (Adapt.). The operating principle is shown in FIGS. 2 and 3.

The following symbols and abbreviations apply:
ψ=flux linking
$\psi_{rd}$=flux linking on the d-axis (rotor flux coordinate)
$L_m$=main inductance
$L_{\sigma s}$=stator leakage inductance
$\sigma_s$=stator dispersion coefficient:

$$\sigma_s = \frac{L_{\sigma s}}{L_m}$$

$L_{\sigma x}$=leakage inductance, x=s: stator, x=r: rotor
$\sigma_r$=rotor dispersion coefficient:

$$\sigma_r = \frac{L_{\sigma r}}{L_m}$$

$$\sigma = 1 - \frac{1}{(1+\sigma_s)(1+\sigma_r)} = \text{total dispersion coefficient}$$

$\theta_{mr}, \hat{\theta}_{mr}$=rotor flux angle, estimated rotor flux angle
$\vartheta_x, \hat{\vartheta}_x, \Delta\vartheta_x$=temperature, estimated temperature, temperature difference x=r: rotor, x=s: stator
$\vartheta_{S_{NTC}}$=measured stator temperature (NTC sensor)
$dQ_{norm}$=normalized reactive power difference
$dQ_{sys\_err}$=system-dependent error in the calculation of reactive power difference $k_P, k_I$=P component and I component gain of a PI controller (adaptation law)
$\hat{U}$=voltage amplitude (output current controller)
$\hat{i}$=current amplitude (current sensor)
φ=phase angle between voltage and current phasor
$R_x, \hat{R}_x$=resistance, estimated resistance, x=r: rotor, x=s: stator
$P_{loss_x}$=power loss, x=r: rotor, x=s: stator
$Z_{Th}, Z_{ij}$=thermal impedance
n=rotational speed
us=stator voltage
is=Is=stator current
d=d-axis
q=q-axis
Isq-R=stator current q-axis real
Isq-M=stator current q-axis model
Isd-R=stator current d-axis real
Isd-M=stator current d-axis model The rotor temperature $\hat{\vartheta}_{r,Th}$ is then described by the following relationship:

$$\vartheta_r = \left(\frac{R_r}{R_{r 20°C.}} - 1\right) * \frac{1}{\alpha_{r 20°C.}} + 20°\text{ C}. \qquad \text{(Equation 6)}$$

Wherein $R_{r,20°C.}$ is the rotor resistance at 20° C. and $\alpha_{r,20°C.}$ is the temperature coefficient of resistance of rotor conductors.

Figure 4:
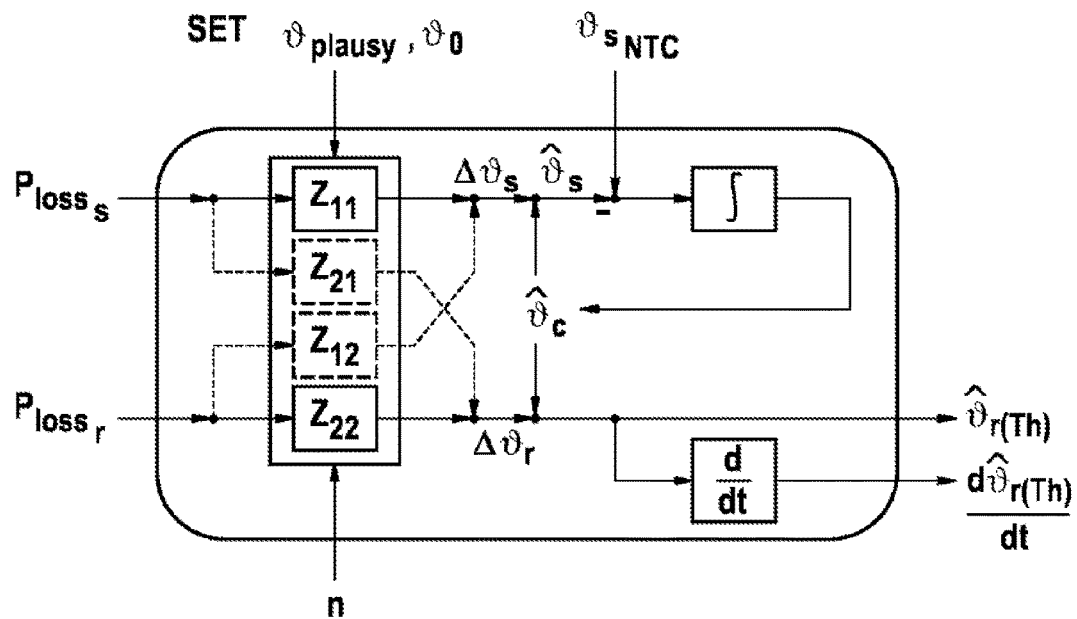
FIG. 4 shows a method for ascertaining a second rotor temperature as a function of losses.

The loss-based thermal model according to method part II applies in this case for:

$0 < u_s < u_{s,min}$:

In an operation in which little voltage is requested, for example at low rotational speeds in a part-load operating range, the voltage error is relatively great, since only setpoint voltage values can be used for the determination method of the first method part I. The thermal model is therefore used for the second method part II, as depicted in FIG. 4 in a simplified manner. Losses of the electric machine can be ascertained in advance either via analytical calculation or with the aid of measurements and can then be stored as a characteristic map as a function of operating points or operating ranges. The transfer functions $Z_{ii}, Z_{22}, Z_{12}$ and $Z_{21}$ are preferably modeled as a PT1 element, or as a higher-order element for greater accuracy. The parameters of the transfer functions can be measured on the basis of the losses of the measured or simulated temperature progressions. It is also advantageous when a cooling temperature $\vartheta_c$ is taken into account. If the cooling temperature is not available, it can be calculated by integrating the difference between the most recent rotor temperature $\hat{\vartheta}_s$ and the measured stator temperature $\hat{\vartheta}_{s,NTC}$:

$$\hat{\vartheta}_c = \int(\vartheta_{S_{NTC}} - \hat{\vartheta}_S)dt \qquad \text{(Equation 7)}$$

The ascertained stator and rotor temperatures are then:

$$\hat{\vartheta}_S = \Delta\vartheta_S + \hat{\vartheta}_c \qquad \text{(Equation 8)}$$

$$\hat{\vartheta}_r = \Delta\vartheta_r + \hat{\vartheta}_c \qquad \text{(Equation 9)}$$

In the operating range in which the first method part I yields reliable results, the first rotor temperature is used as a relevant rotor temperature in order to correct the estimation in the thermal model of the second method part II, so that the cumulative error is minimized, as is also shown in FIG. 1. The operating principle is shown in FIG. 4.

The first method part III accounts for the operating state in which the electric machine is stopped. The methods according to I and II do not function in this case. In order to permit the rotor temperature to be ascertained nevertheless, the asynchronous machine is operated as a transformer. For this purpose, a sinusoidal current is excited in the d-axis of the electric machine. At a higher frequency, a relationship can be established between the electric variable and resistances of the electric machine.

$$\cos\varphi * \frac{\hat{U}}{\hat{I}} \approx R_s + \left(\frac{1}{1+\sigma_r}\right)^2 * R_r \quad \text{(Equation 10)}$$

$$R_r \approx \left(\cos\varphi * \frac{\hat{U}}{\hat{I}} - R_s\right) * (1+\sigma_r)^2 \quad \text{(Equation 11)}$$

Finally, the rotor temperature $\hat{\vartheta}_{r,St}$ determined by the method part II according to Equation 6.

Figure 5:
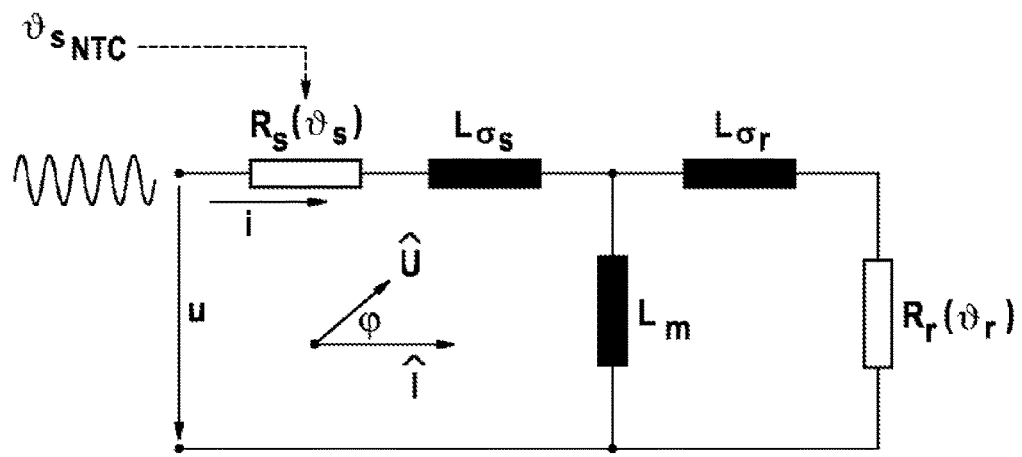
FIG. 5 shows a method for determining the second rotor temperature at rest.

FIG. 5 shows a simplified representation of the third method part III. The following abbreviations also apply here:

$\hat{I}$: current amplitude (current sensor)
$\hat{U}$: voltage amplitude (output current controller)
$\varphi$: phase angle between voltage and current phasor
$R_s$: stator resistance, temperature dependence can be compensated by the measured stator temperature (NTC sensor in the winding) or can be ascertained on-line in the inverter using the following equation:

$$R_s \approx \frac{\hat{U}}{\hat{I}}.$$

The control unit now selects, as a function of the current operating range of the electric machine, the correct method part I, II or III for determining the rotor temperature $\hat{\vartheta}_{r,Fu}$ for the plausibility checks and combines the results in order to determine a single, plausibility-checked signal for the rotor temperature, as shown in FIG. 1.

The invention claimed is:

1. A computer-implemented method for determining a rotor temperature of an electric machine, the method comprising:
    exciting the electric machine with an alternating current;
    determining, with an electronic processor and a current sensor, a first rotor temperature as a function of reactive powers, a first reactive power calculated based on stator phase voltage and stator current measured by a current sensor and a second reactive power calculated based on a flux model, having motor parameters, stator frequency, and current as input variables,
    determining, with the electronic processor, a second rotor temperature as a function of losses of the electrical machine, the losses being losses in power,
    depending on an operating range of the electric machine, checking, with the electronic processor, a plausibility of the first rotor temperature by ascertaining a temperature change as a function of the losses and using the temperature change as a limit value in the determination of the first rotor temperature, and
    controlling, via the electronic processor, torque of the electric machine based on at least one selected from the consisting group of the first temperature and the second temperature.

2. The method as claimed in claim 1, wherein when the operating range of the electric machine is a part-load operating range the first rotor temperature is replaced by the second rotor temperature.

3. The method as claimed in claim 1, wherein system-dependent errors are ascertained and stored in a characteristic map as a function of at least one reactive power for the determination of the first rotor temperature.

4. The method as claimed in claim 1, wherein the second rotor temperature is plausibility-checked by the first rotor temperature.

5. The method as claimed in claim 3, wherein the system-dependent errors are measured before the start-up of the electric machine.

6. The method as claimed in claim 1, wherein the first rotor temperature is replaced by the second rotor temperature when the electric machine is stopped, wherein the electric machine is excited with the alternating current in order to determine an electric resistance of the electric machine, and the second rotor temperature is determined as a function of the electric resistance.

7. A device for operating an electric machine, the device configured to:
    excite the electric machine with an alternating current,
    determine, with an electronic processor, a first rotor temperature as a function of reactive powers, a first reactive power calculated based on a stator phase voltage and a stator current measured by a current sensor and a second reactive power calculated based on a flux model, having motor parameters, stator frequency, and current as input variables,
    determine, with the electronic processor, a second rotor temperature as a function of losses of the electrical machine, the losses being losses in power,
    depending on an operating range of the electric machine, check, with the electronic processor, a plausibility of the first rotor temperature by ascertaining a temperature change as a function of the losses and using the temperature change as a limit value in the determination of the first rotor temperature, and
    control, via the electronic processor, torque of the electric machine based on at least one selected from the consisting group of the first temperature and the second temperature.

8. A non-transitory, computer readable medium connected to an electronic processor and comprising instructions that when run with the electronic processor cause the electronic processor to
    excite an electric machine with an alternating current,
    determine a first rotor temperature as a function of reactive powers, a first reactive power calculated based on a stator phase voltage and a stator current measured by a current sensor and a second reactive power calculated based on a flux model, having motor parameters, stator frequency, and current as input variables,
    determine a second rotor temperature as a function of losses of the electrical machine, the losses being losses in power,
    depending on an operating range of the electric machine, check a plausibility of the first rotor temperature by ascertaining a temperature change as a function of the losses and using the temperature change as a limit value in the determination of the first rotor temperature, and
    control, via the electronic processor, torque of the electric machine based on at least one selected from the consisting group of the first temperature and the second temperature.

* * * * *